US011675348B2

(12) United States Patent
Sica et al.

(10) Patent No.: US 11,675,348 B2
(45) Date of Patent: Jun. 13, 2023

(54) MISSION PLAN PATHS FOR MULTI-DOMAIN ASSETS

(71) Applicant: Raytheon Company, Waltham, MA (US)

(72) Inventors: Michael P. Sica, Oak Hill, VA (US); Michael C. Xu, Reston, VA (US)

(73) Assignee: Raytheon Company, Waltham, MA (US)

( * ) Notice: Subject to any disclaimer, the term of this patent is extended or adjusted under 35 U.S.C. 154(b) by 175 days.

(21) Appl. No.: 16/668,850

(22) Filed: Oct. 30, 2019

(65) Prior Publication Data

US 2021/0132601 A1 May 6, 2021

(51) Int. Cl.
*G05D 1/00* (2006.01)
*G05D 1/02* (2020.01)
(Continued)

(52) U.S. Cl.
CPC ......... *G05D 1/0011* (2013.01); *G05D 1/0206* (2013.01); *G05D 1/0287* (2013.01);
(Continued)

(58) Field of Classification Search
CPC .. G05D 1/0011; G05D 1/0206; G05D 1/0287; G05D 1/0808; G05D 1/0038;
(Continued)

(56) References Cited

U.S. PATENT DOCUMENTS

| 7,194,353 B1 * | 3/2007 | Baldwin | G08G 5/0013 |
| | | | 701/528 |
| 8,234,068 B1 * | 7/2012 | Young | G08G 5/0069 |
| | | | 701/410 |

(Continued)

OTHER PUBLICATIONS

Ramirez-Atencia Cristian et al: "Solving complex multi-UAV mission planning problems using multi-objective genetic algorithms", Soft Computing, Springer Verlag, Berlin, DE, vol. 21, No. 17, Oct. 3, 2016 (Oct. 3, 2016), pp. 4883-4900, XP036303623, ISSN: 1432-7643, DOI: 10.1007/S00500-016-2376-7, (Year: 2016).*

(Continued)

*Primary Examiner* — Jeff A Burke
*Assistant Examiner* — Joshua Alexander Garza
(74) *Attorney, Agent, or Firm* — Schwegman Lundberg & Woessner, P.A.

(57) ABSTRACT

A computer architecture includes an application program interface (API). The API does not include a user interface. The computer architecture asynchronously receives into the API data relating to mission plan domains from clients. The data include an identification of vehicles, goals of the vehicles, and threats to the vehicles. The mission plan domains include an air domain, a sea or ocean domain, and a land domain. The computer architecture uses a parallel processing scheme to process the mission plan domains from the clients for determining goal priorities for each of the plurality of vehicles, processing the data using a genetic algorithm and physics models associated with the plurality of vehicles, and transmitting to the vehicles path commands based on the processing of the genetic algorithm.

17 Claims, 9 Drawing Sheets

(51) Int. Cl.
*G05D 1/08* (2006.01)
*H04L 67/12* (2022.01)
*G08G 1/09* (2006.01)
*G08G 3/00* (2006.01)
*G08G 5/00* (2006.01)

(52) U.S. Cl.
CPC ............. *G05D 1/0808* (2013.01); *G08G 1/09* (2013.01); *G08G 3/00* (2013.01); *G08G 5/003* (2013.01); *H04L 67/12* (2013.01)

(58) Field of Classification Search
CPC ............. G08G 1/09; G08G 3/00; G08G 5/003; G08G 5/0043; G08G 5/0039; G06F 3/00; H04L 67/12
See application file for complete search history.

(56) References Cited

U.S. PATENT DOCUMENTS

| | | | | |
|---|---|---|---|---|
| 8,626,540 | B2* | 1/2014 | Peterkofsky | G06Q 10/08 705/7.11 |
| 8,843,303 | B1* | 9/2014 | Young | G08G 5/006 701/122 |
| 10,249,197 | B2* | 4/2019 | Castillo-Effen | B64C 39/024 |
| 10,792,568 | B1* | 10/2020 | Merrill | A63F 13/56 |
| 2009/0326735 | A1* | 12/2009 | Wood | G05D 1/0088 701/2 |
| 2011/0184604 | A1* | 7/2011 | Franke | F41G 9/00 701/23 |
| 2014/0214469 | A1* | 7/2014 | Callow | G06Q 10/00 705/7.15 |
| 2017/0262790 | A1* | 9/2017 | Khasis | G08G 1/0116 |
| 2017/0264493 | A1* | 9/2017 | Cencini | H04L 67/1008 |
| 2019/0324438 | A1* | 10/2019 | Cella | G05B 19/4185 |
| 2021/0252698 | A1* | 8/2021 | Paxton | B25J 9/161 |

OTHER PUBLICATIONS

Dionne et al. ( D. Dionne and C. A. Rabbath, "Multi-UAV Decentralized Task Allocation with Intermittent Communications: the DTC algorithm," 2007 American Control Conference, 2007, pp. 5406-5411, doi: 10.1109/ACC.2007.4282637.) (Year: 2007).*

Shashi Mittal and Kalyanmoy Deb, "Three-dimensional offline path planning for UAVs using multiobjective evolutionary algorithms," 2007 IEEE Congress on Evolutionary Computation, 2007, pp. 3195-3202, doi: 10.1109/CEC.2007.4424880. (Year: 2007).*

Orbit Logic, "UAV Planner", Retrieved Online. URL: <www.orbitlogic.com/uav-planner.htmi>, 6 pgs.

Press, "Veronte Curve-based navigation in UAV operations", sUAS News, Retrieved Online. URL: <https://www.suasnews.com/2017/06/veronte-curve-based-navigation-uav-operations/>, (Jun. 2, 2017), 2 pgs.

Walan, Alexander M.G., "Application of Maneuver-Based Control in Variable Autonomy Unmanned Combat Aerial Vehicles", (Mar. 2003), 112 pgs.

"International Application Serial No. PCT/US2020/057742, International Search Report dated Mar. 4, 2021", 3 pgs.

"International Application Serial No. PCT/US2020/057742, Written Opinion dated Mar. 4, 2021", 6 pgs.

Hershey, Paul, et al., "Common ground control system (CGCS) to support autonomous object observation, collection, and response in multi-domain environments", Annual IEEE International Systems Conference (SYSCON), (Apr. 23, 2018), 1-6.

"International Application Serial No. PCT/US2020/057742, International Preliminary Report on Patentability dated May 12, 2022", 8 pgs.

* cited by examiner

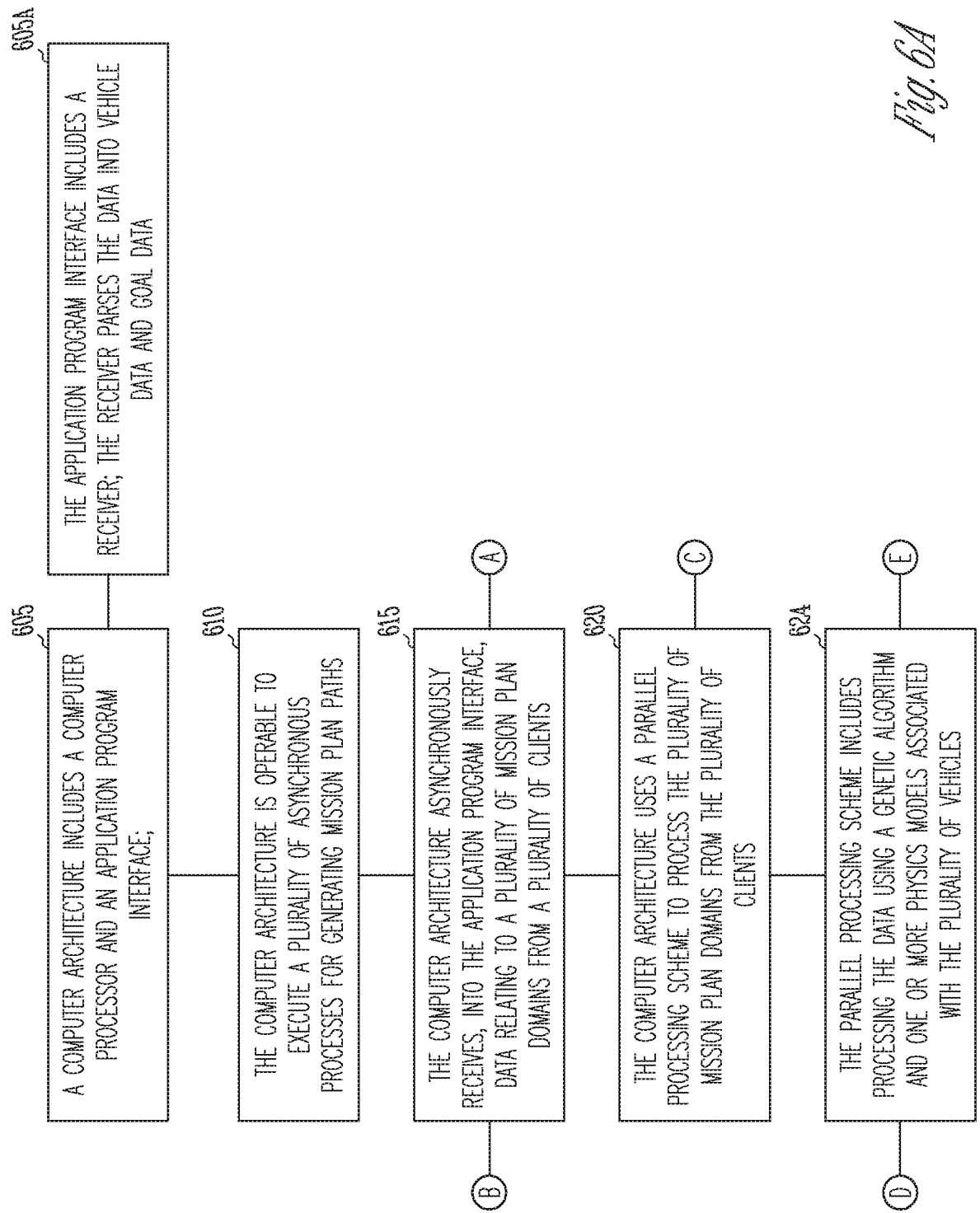

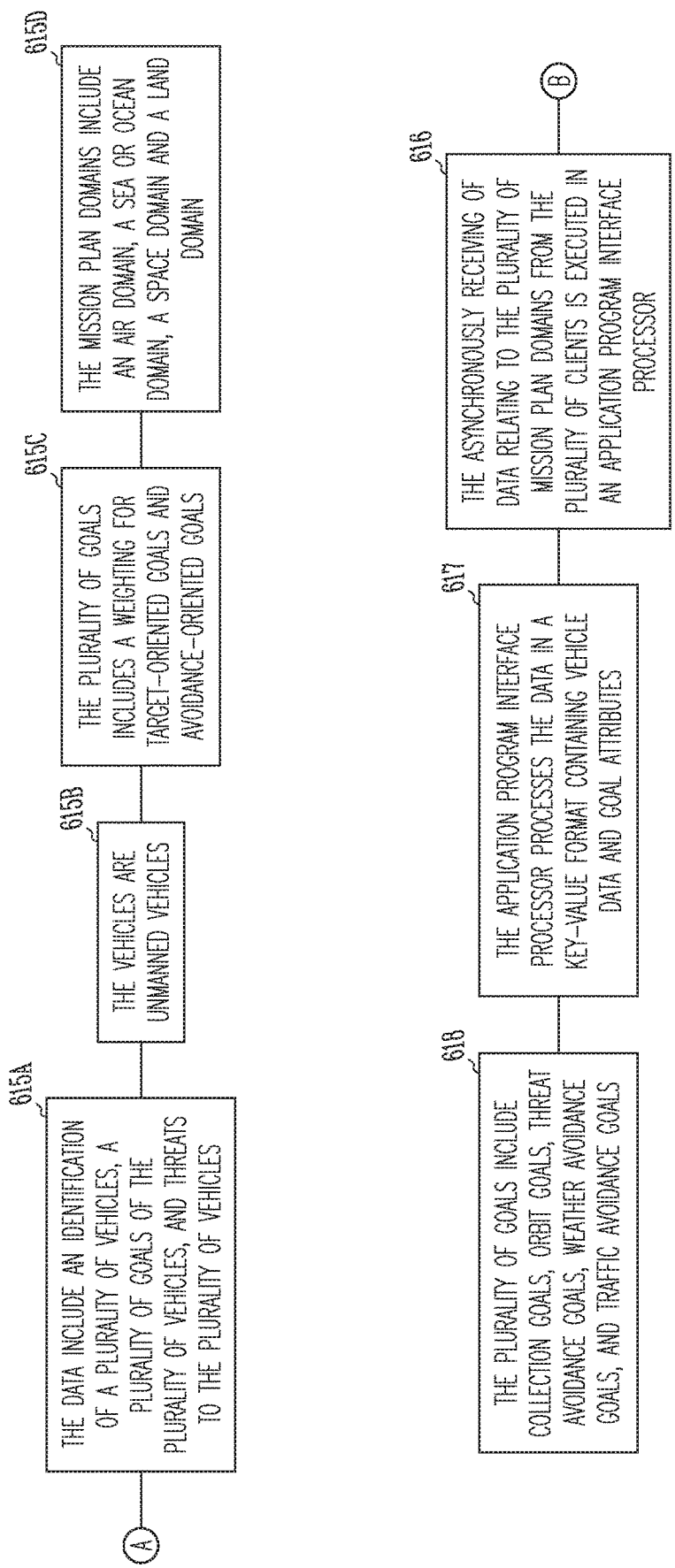

MISSION PLAN PATHS FOR MULTI-DOMAIN ASSETS

TECHNICAL FIELD

Embodiments described herein generally relate to mission plan paths for multi-domain assets, and in an embodiment, but not by way of limitation, a system and method for automatic creation and scoring of mission plan paths for multi-domain assets.

BACKGROUND

Traditional methods of generating a mission plan path for an asset rely on significant human intervention, often requiring hours to verify realizable constraints. If paths need to be planned for multiple assets across multiple domains, the total time required is multiplied. Although there are existing alternative path planners, these products are not goal-based but rather waypoint-based resulting in imprecise trajectory. Additionally, these products are often concerned only with a single domain, do not consider the technical challenges and issues that arise when considering a multi-domain scenario, and thus are not well suited for multi-domain applications.

Specifically, most prior systems only operate in the air domain. For example, in a prior system referred to as vector control, an operator maintains vigilance over the trajectory of an airborne asset using a real-time control input device (e.g., a joystick). In this mode of control, an operator can maintain precise and dynamic trajectory control over the asset, but this requires the operator to continually divert his or her attention specifically to that asset over the lifetime of its path. Sustained attention to a single asset can be mentally taxing for a human operator. Furthermore, an operator can only perceive the current moment using this mode of control.

Another prior system can be referred to as waypoint control. Waypoint control defines a path by giving the asset infrequent mission plan updates, generated from mission goals and constraints during a mission planning process. While the defined path can cover a longer future route than in the vector control system, the asset may not be able to navigate to these waypoints with consistent accuracy. This is because waypoint control merely dictates a sequence of waypoints, but does not factor in whether the physics of the asset would allow it to accurately traverse these waypoints.

Another system includes curve-based navigation capacity in unmanned air vehicle (UAV) operations. This navigation capability allows a user to define missions made of an unlimited quantity of points and lines, either curved or straight, replacing traditional waypoints with smooth path segments. An issue with this system is that the paths are not automatically generated, and thus must still be manually created. Additionally, this system cannot support multiple requests from multiple domains in rapid succession and return a generated mission plan for each request without human intervention at its intermediate steps. This system is not a multi-domain solution, and it is only applicable to the air domain.

Another prior system can be referred to as Maneuver Based Control (MBC). Previous UAV studies have shown a need for the ability to vary the amount of control exercised by an operator. MBC allows UAV operators to increase the level of manual control over the air vehicle in situations where quick response time is required. Thus, human operators can choose to enter into the decision making loop, where they excel, while allowing the automated system to retain basic flight control functions. In a related system, a method for MBC allows the human operator to make timely in-flight mission changes by modifying and inserting waypoints into the mission plan as well as by manual icon-based input. Situational awareness is enhanced by utilizing the waypoint concept and other existing tools and techniques and by eliminating the need of operators to attempt to transform their frame of reference into that of the UAV. Again however, the MBC systems require human intervention and are specific to the air domain.

Another prior system that includes algorithmic planning can be referred to as a UAV planner. This UAV planner also does not support the capability to asynchronously calculate mission plans for multiple clients in parallel.

In summary, in prior path planning systems, an operator has to plot out waypoints on a map or issue headings in real time. Prior systems also do not take into account traffic in the pertinent area and "keep out" zones. Prior systems further do not consider the physics of the vehicle. For example, if a vehicle needs to turn, prior systems do not take into account minimum and maximum turn radius and minimum and maximum speed, or how the winds might adversely affect the vehicle. Further, prior systems require user interfaces for an operator to monitor the system.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 6A, 6B, and 6C are a block diagram of operations and features for a system for generating mission plan paths for multi-domain assets.

DETAILED DESCRIPTION

In response to the issues with existing path planners, an embodiment of this disclosure enables rapid and computationally driven generation of mission plans by using a multi-domain, goal-based path planner that utilizes a genetic algorithm backed by physics models. The path planner of this embodiment provides realistic path generation. The automatic, algorithmic approach to path generation provided by this embodiment reduces the amount of human effort required, allowing a person to be more of a manager than an operator. A goal then of one or more embodiments is to improve and automate mission planning for unmanned systems. An embodiment does not include a user interface, which makes it a headless operation that can run multiple times in parallel for multiple dissimilar vehicles at the same time.

The physics model for the vehicle relates to factors such as the turn radius, velocity, size, and vehicle type (e.g., land versus water). These data can be used as follows. In the case of an air vehicle, if the aircraft is flying in a straight line, and then receives a command to turn left in $t_n$ time, and the system wanted to determine where the aircraft will be in $t_{n+m}$ time (where $t_m$ is the elapsed time), this can be determined using the physics model. Also, if the aircraft does not make the turn at the correct angle, the aircraft may end up much further to the left or much further to the right. The system can use the physics model to help figure out whether or not the path is going to satisfy or violate the goal that the operator has proposed.

Figure 1:
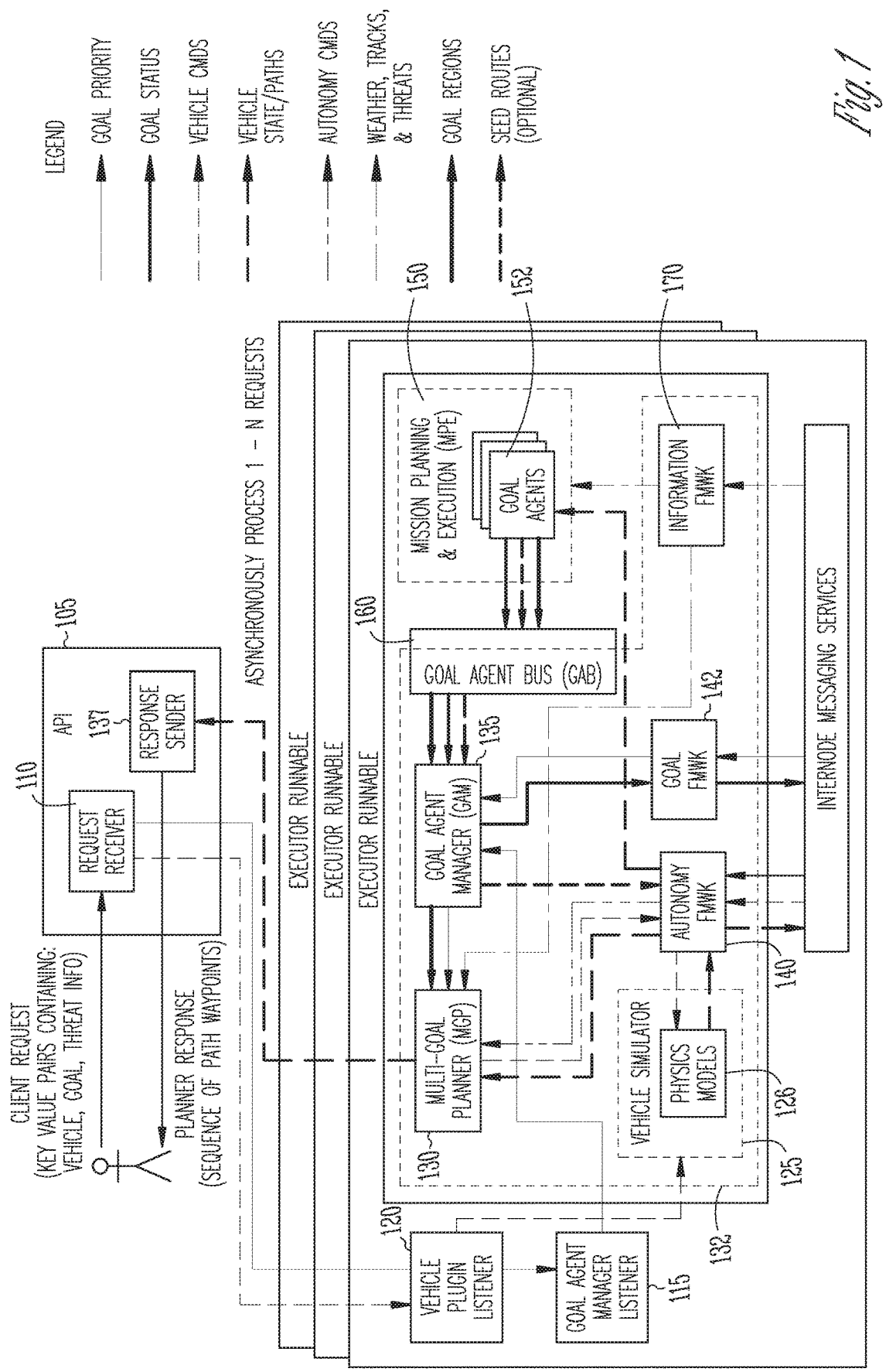
FIG. 1 is a block diagram of an embodiment of a multi-domain goal-based path planner architecture.
Figure 2:
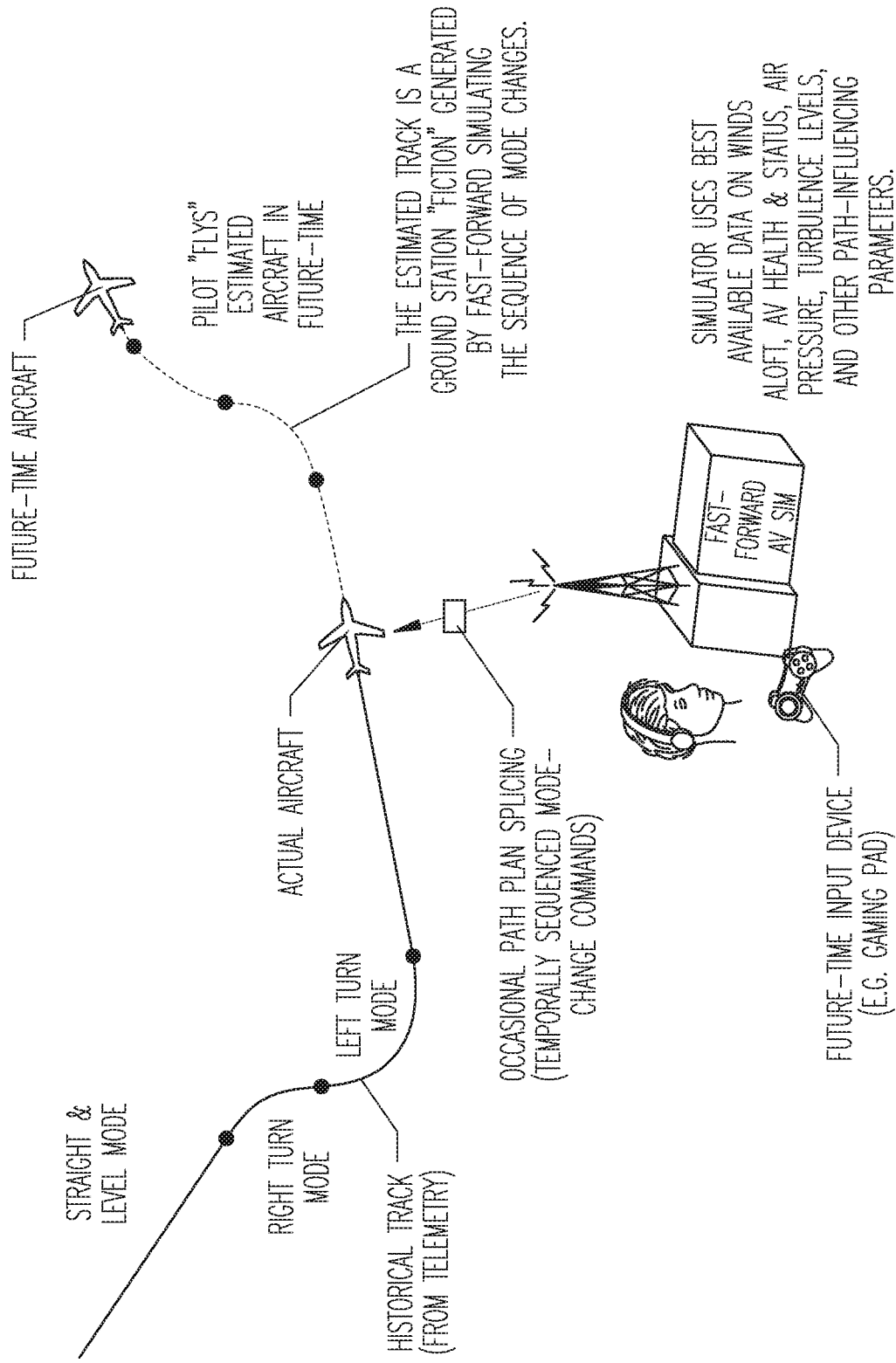
FIG. 2 illustrates a path finder mode or path mode.

Referring to FIG. 1, at the top level of the multi-domain goal-based path planner is an application program interface (API) 105 that can asynchronously process multiple client requests. Examples of clients could include a COA planner, UAV operator, or a mission planner. The specific software used by those personnel would interface with the API to send the appropriate requests. In an embodiment, these multiple client requests are in a JavaScript Object Notation (JSON) format. The requests are handled by a receiver 110 that parses them into vehicle data and goal data, which in an embodiment are transmitted to and handled specifically by a goal agent manager (GAM) listener 115. Various goal types are supported, such as data collection goals, orbit goals, as well as goals to avoid impediments such as threats, weather, and traffic. Data from the goals of the mission are used to create the GAM 115, which contains a list of all goals that the client provided. The data from the GAM 115 is then distributed to necessary components via the frameworks to start the multi-goal planner (MGP) 130, which houses a genetic algorithm for path planning. The MGP 130 within the vehicle planning and execution module 132 generates the path. FIG. 2 illustrates the generation of such a path. In particular, there are several different modes—straight and level mode, right turn mode, and left turn mode. When an aircraft turns right or left at $t_n$ time, it can determine the vehicle location by an elapsed time from factoring in the speed and turn radius in its physics model. The MGP 130 can check against all the goals relating to the three-dimensional air space, such as a goal of a particular altitude. For example, if the air vehicle flies too high, the air vehicle might encounter another air vehicle. Similar problems can occur if the vehicle flies too far to the left or right. However, the MGP 130 by itself does not support multiple paths being generated at the same time. Rather, the architecture of the multi-domain path planner illustrated in FIG. 1 is needed. Data from the vehicle plugin 120 is used to start a vehicle simulator 125, which houses the physics models 126. The required vehicle plugin data include the vehicle name, vehicle type, starting latitude and longitude, ingress latitude and longitude, altitude, speed, vehicle weight, maximum fuel, fuel burn rate, and contingency plan coordinates.

The multi-domain goal-based planner of FIG. 1 further includes a goal agent manager 135. The goal agent manager 135 receives goals from the API and starts the MGP, which listens for goal information. The goal agent manager also creates a Goal Agent data type 152 within the Mission Planning and Execution module 150 for each goal via communication through the Goal Framework 142, Internode Messaging Services, and Information Framework 170. The information framework provides environment information such as weather, and flight paths from other vehicles. The goal agent manager receives the goal information from each goal agent via the Goal Agent Bus 160 for path computation, and then delivers goal and environment information to the MGP. An autonomy framework 140 provides the MGP with physics models of the necessary vehicle types to accurately compute paths, and the goal framework receives updates from the MGP when the MGP has successfully added a goal to its ongoing path computation. The response sender 137 transmits the calculated paths back to the user.

Figure 3:
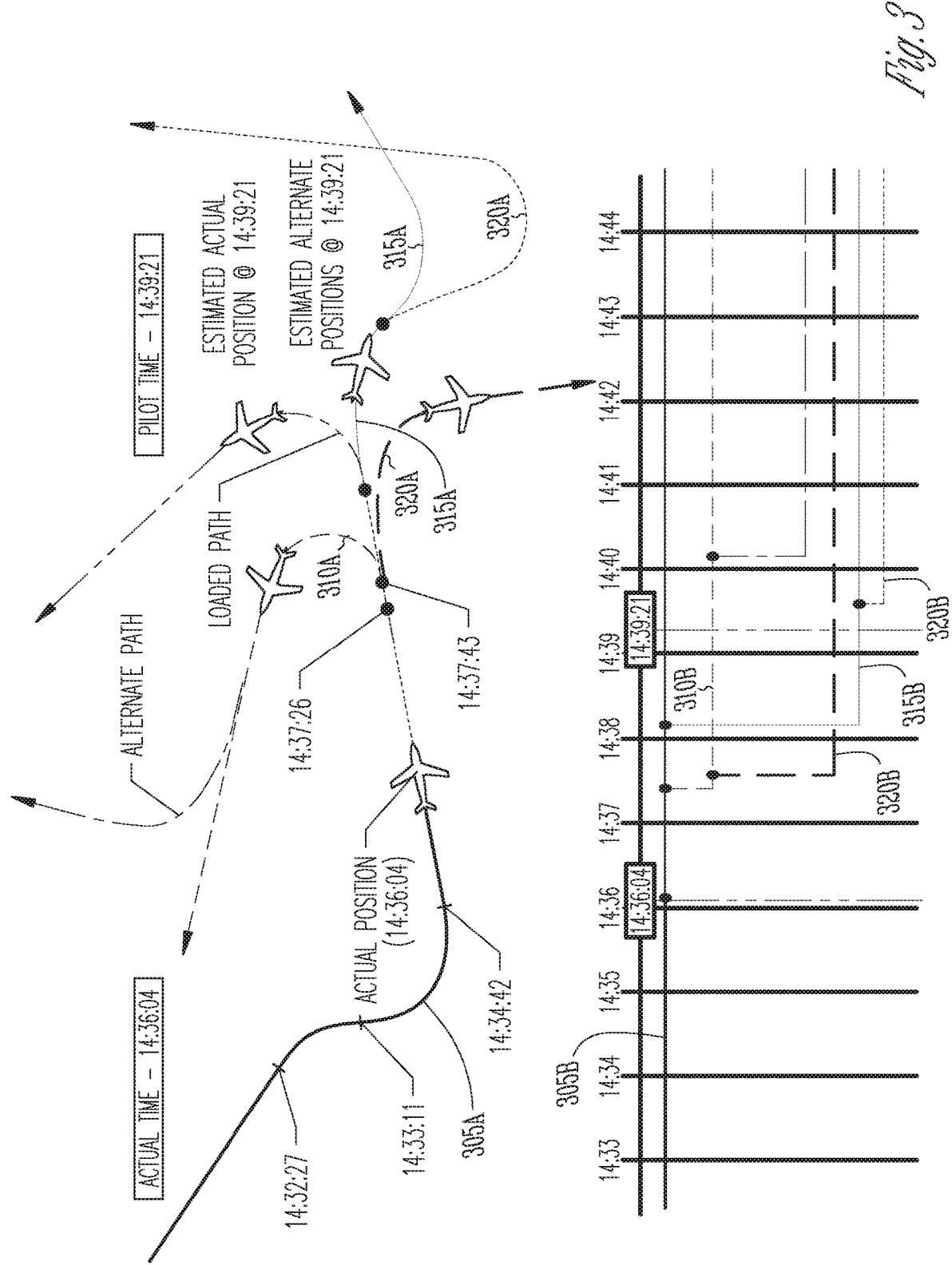
FIG. 3 illustrates an example of the multiple different paths that can be generated by a multi-goal planner.

FIG. 3 illustrates an example of the multiple different paths that can be generated by the MGP 130 in an example scenario considering an aerial vehicle. Each path includes path segments, which relate back to the modes of straight and level, turn left, turn right, or climb. As illustrated in FIG. 3, the MGP 130 builds a path tree to represent all of the data, which illustrates how a preliminary path 305A, 305B turned into several different paths 310A, 310B, 315A, 315B, 320A, and 320B.

Referring back to the architecture of FIG. 1, a user provides vehicle information and goals to the system, and the system of FIG. 1 plans a path for an unmanned aerial vehicle or other vehicle. For example, the user may stipulate that the vehicle should avoid bad weather or one or more threats (e.g., avoid certain geographic areas, altitudes etc.). The user may also provide a location at which the vehicle should loiter, and perhaps capture pictures at that location, and then travel to other locations to capture other pictures. The user does not provide any information about the paths to get to these locations or the velocity of the vehicle. The user only provides the goals and optionally one or more constraints and/or desirables as discussed above. When these goals come into the system, the system dynamically launches an executor runnable for each vehicle. As a result, the user does not have to function as a pilot.

In an embodiment, the goals can be prioritized. For example, the user can provide goals of capturing a picture of a location and also avoiding bad weather. The user can further make taking the picture a higher priority, so that if the only way to get the picture is to travel through the bad weather, the vehicle will do so to get the needed picture. Although if there is a way to get the picture and avoid the bad weather, the system will choose that path.

Once again, the vehicle information and the goals are input into the MGP 130. The MGP coordinates scoring the generated path against all of the goals that the user proposed. Messages are sent back and forth through the various frameworks (e.g., the autonomy framework 140 and the goal framework 142) that all communicate with the vehicle physics model 126. Eventually, the system determines a path that has a high enough score for that path to be considered as having satisfied all the goals. For example, if a goal is to collect three pictures, a path that results in all three pictures being collected while also avoiding traffic and weather would have the highest score. However, if a path only collects two pictures, but not the third picture, that path will have a lower score which will cause the genetic algorithm to keep planning because it hasn't reached a valid solution yet.

Figure 4:
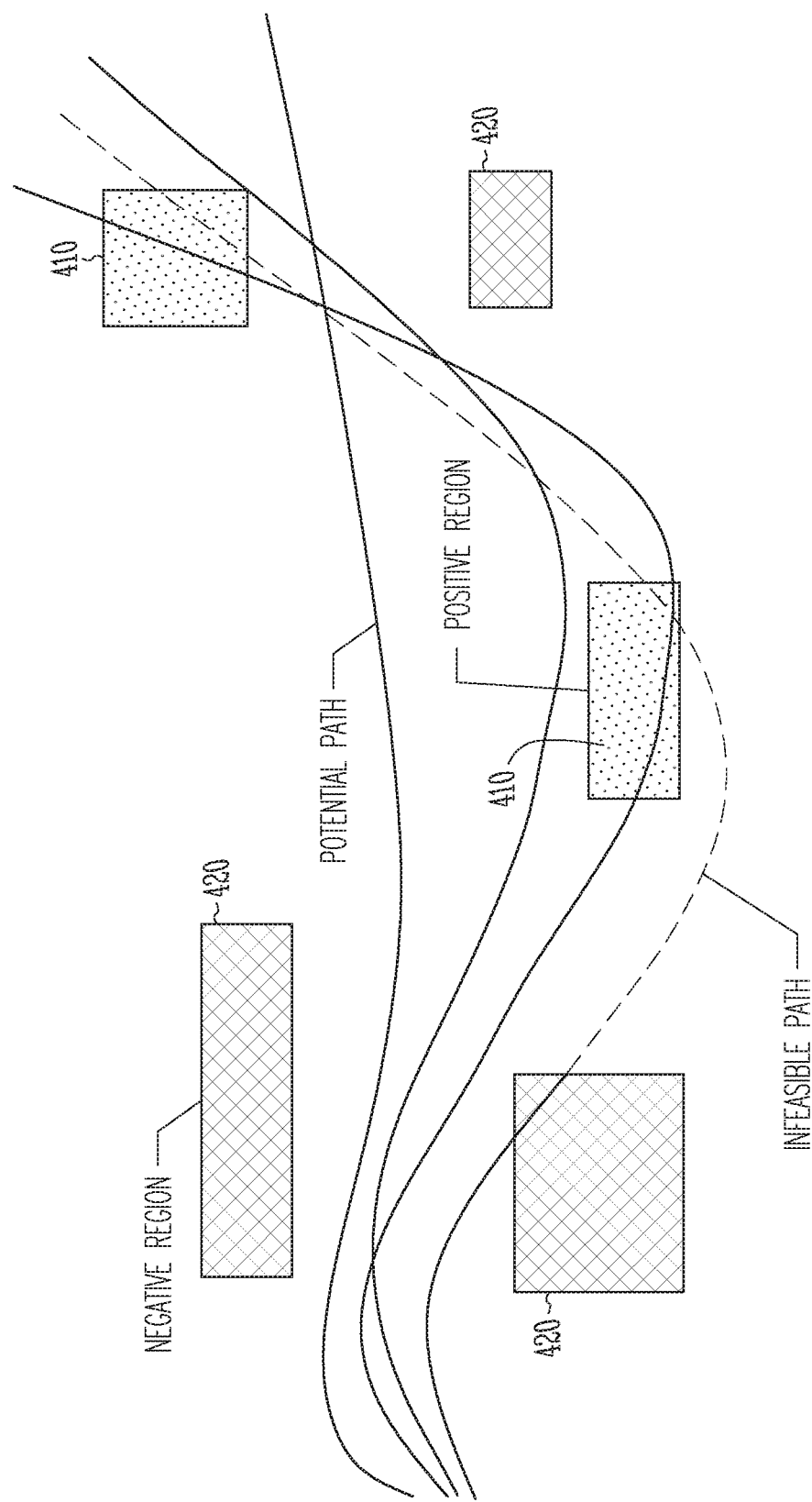
FIG. 4 is an example of an output of a multi-domain goal-based path planner.

Referring now to FIG. 4, the positive regions 410 represent factors for which time should be maximized. The negative regions 420 are factors for which time should be minimized. Examples of positive regions could be places where a user needs to take a picture, and negative regions could be places where the user needs to avoid because there are threats, traffic, or weather. The genetic algorithm starts a route, and then branches out paths in hundreds or even thousands of directions. The paths in all of these different directions are scored against the goals, and some paths will score higher than others. The genetic algorithm then evolves the population of paths, and carries over the best path into the next generation for a new seed route. However, just like in genetics, sometimes there are mutations during evolution. For example, a left turn can now become a right turn. Through all of these evolutions, eventually a path that satisfies all the goals, or satisfies the goals within some threshold of the maximum score that the user defined, will be generated. This path is the one transmitted back to the user in some embodiments.

It is noted that with the API 105, there is no need for a user interface. With the API, the system can handle multiple external requests from multiple users for multiple vehicles. Additionally, the system can handle requests for multiple vehicle types in addition to air vehicles, such as land vehicles and water-based vehicles. For example, an autonomous car can have a goal of driving straight and a goal of avoiding potholes. If the car then senses a pothole in the road, the goal of avoiding potholes causes the car to veer off its straight course and first go into a left turn mode to avoid the pothole, then a right turn mode to return back to its course, and then return to the straight mode to continue on.

Consequently, an embodiment can execute multiple paths in parallel without an operator. An embodiment includes a fully autonomous mode where, for example, a water vehicle can navigate to a dock on its own. The system will constantly upload the best path to get to the harbor and eventually the dock. Alternatively, the system could be put into a mode where the operator has to review the path and accept it. That is, there are varying levels of autonomy. Once again, these workings of the system utilize the path mode control and the genetic algorithm. However, the system may not come up with the optimal solution because at times in genetic algorithms there are local optima problems where they find something that will satisfy all of the goals, but it may not be the absolute best solution. The system is also naturally validating because it is based off the physics model that knows how the vehicle is going to move in the future. The system therefore has a better idea of how to score whether or not the path is going to work or not work. In the waypoint solution, the path is simply a series of lines. However, in contrast, in this embodiment, the system is aware of the proper curves as the vehicle is navigating through its domain.

After the MGP 130 reaches a user-defined satisfaction criteria, it sends the newly generated path waypoints into the response sender 137, which then returns the mission plan result in an intuitive format (such as the JSON format) that contains waypoint information, orbit information in the appropriate order of waypoints, and time estimates for each action. An example of the format of a mission plan result is as follows. It should be noted that while the system itself does not have a user interface, visualization of the generated path is possible through the incorporation of third party mapping utilities, as suggested by the field "mapApiRequest".

```
{
    "JOB_ID": "d67b00e2-0e31-3333-997f-9bc1cf95e20a",
    "MESSAGE_TYPE": "GOAL_PLANNER_RESPONSE_TYPE",
    "status": "SUCCESS",
    "statusReason": "path for all targets computed",
    "routeProjection": "RHUMB",
    "path": [{
        "source": "AUTO_ROUTED",
        "waypointType": "NAV_ONLY",
        "goalId": null,
        "time": 1542116602293,
        "latitude": <Degrees>,
        "longitude": <Degrees>,
```

-continued

```
        "altitude": 1000.0
    }, {
        "source": "OPERATOR_DEFINED",
        "waypointType": "COLLECTION_GOAL",
        "goalId": "Red_C2_Center",
        "time": 1542119242293,
        "latitude": <Degrees>,
        "longitude": <Degrees>,
        "altitude": 1000.0
    }, {
        "source": OPERATOR_DEFINED,
        "waypointType": ORBIT_GOAL,
        "goalId": "Holding_Point_01",
        "time": 1542122602294,
        "orbitType": "CIRCULAR",
        "radius": 500.0,
        "duration": 60000,
        "distance": 3395.304,
        "orbitDirection": "CW",
        "foci": [{
            "latitude": <Degrees>,
            "longitude": <Degrees>,
            "altitude": 1000.0
        }]
    }],
    "mapApiRequest": "..."
}
```

Since the path planner is capable of operating in a multi-domain environment as long as the appropriate physics model exists, it can also generate missions for land assets such as autonomous cars and trucks, and sea assets such as unmanned underwater vehicles (UUVs) and boats. However, an embodiment that relates to aircraft simply cannot be applied to an embodiment for boats or underwater vehicles for example. One reason is that an underwater vehicle moves much slower and can turn much sharper than an aircraft. Consequently, some of the maps that are used in connection with an aircraft system have to be changed. If these maps are not changed when a left turn command in provided to the underwater vehicle, the underwater vehicle may do something strange like spin around multiple times in the same spot because of tis higher turn rate. The specific changes to these maps to avoid this problem include using a wheel-over-position formula to calculate the turning angle of the vehicle, using modulus operations to check if the vehicle has made multiple rotations from a reference position, and using the vehicle's speed and Euler angles to calculate the time spent in a turn. Many of these changes can be made with the vehicle planning execution box 132 and the mission planning and execution box 150.

A fundamental component of the multi-domain goal-based path planner is referred to as the path mode control, which is used by the genetic algorithm of the multi-domain goal-based path planner. It is an improvement over waypoint control since it estimates the future state of an asset in any domain as it travels to its target using the physics model 126 of the vehicle for its domain. This ensures asset behavior that is within realistic constraints, ultimately allowing the vehicle to accurately traverse targets and waypoints. However, waypoint control fails to place constraints on the timing and orientation of the vehicle. In contrast, path mode control explicitly dictates the timing and orientation of a vehicle as it traverses though a path to its target, appropriately adjusting both the timing and orientation factors as the vehicle encounters environmental stimuli.

Navigation through a path consists of a set of time-dependent vehicle mode changes taking place in the immediate future from the current trajectory of the asset. The mode of an asset is defined by a vehicle mode data structure consisting of the mode type, which supports updating angles for turning, ascent, and/or descent. The vehicle mode data structure is a general interface that supports casting to the specific data structures whose names pertain to the following turning modes: flight mode, level-on-heading mode, open-turn mode, and waypoint mode. Open turn mode supports turns of various intensities and directions including shallow, normal, and hard left or right turns. For example, a vehicle can be flown in open-turn mode, and the MGP can generate a hard right turn for that vehicle to avoid an obstacle.

As part of its implementation in path mode control, the path of an asset is defined by a path data structure consisting of vehicle information, telemetry data, and a list of path elements. Each path element corresponds to a valid path mode for the asset—straight and level, coordinated turn, straight climb, turning descent, and so forth. Path elements may be refined or specialized with parameters, such as turn radius or speed. The set of valid path modes may also change depending on the domain. For example, for land assets, straight climb does not make logical sense.

The function of the path data structure is to represent the estimated path of the asset with the best available information. This is done with one or more methods that provide asset status information given an absolute time in the future. Status information includes not only position, orientation, and rate information, but other time-varying system variables such as estimated fuel/battery remaining and subsystem status.

A path element, defined by a path element data structure, which contains the starting time and the vehicle mode of the vehicle, is a continuation of a path in a future time with a defined vehicle mode. This preserves the requirement that there be no discontinuities in the path. Alternate paths may be created by branching from an existing path by rooting the potential branch at any future time by the following process:

1) Identify an originating path
2) Specify an absolute future time
3) Specify a vehicle mode to implement in the new path element
4) Create the new path element, rooted at the future time in the originating path To modify a path, the previous four steps are followed by two more:

5) Insert the new path element onto the originating path
6) Remove the path element objects from the originating path that were replaced by the new path element.

If steps 5 and 6 are not executed, then the alternate paths create a tree data structure, with the root of the tree defined by the latest telemetry, and branches rooted in either the main path or another branch. Every time new telemetry is downloaded from the asset, the estimates on the tree are recalculated from the root up to each branch. Alternately, the simulation estimation process can be deferred until a request for a future system state on one of the branches is initiated. In this case the process only has to be executed on the trunk and branches from the tree root to the position in question.

In an embodiment, the system implements region scoring from paths. The MGP 130 uses a genetic algorithm to score multiple generated paths, and ultimately chooses the path with the score closest to the sum of the ranked weights of all the collection goals in a user request received via the API 105.

Before the start of the algorithm, the following actions and/or items are desired in some embodiments:

A set number of seed paths are generated at random. All these generated paths currently have the same default score.

A given number of turn modes that are used in Path Mode Control. The modes consist of LevelOnHeading, OpenTurn, FlightMode, and WaypointMode. Equal weighting is given at the beginning of the algorithm for each of these modes.

A weighting scheme for each of the goals in a run of the algorithm. For target-oriented goals (rather than avoid-oriented goals), an often-used scheme is exponential weighting: $y=(½)^{(n-1)}$ where y is the weight of the goal, and n is the order of the goals to be traversed, starting from $\{1 \ldots N\}$. Other weighting schemes include uniform and linear.

At the start of the algorithm, in the initial path population a random path object is selected, and a path segment with a geographic coordinate and a path mode is appended to it. This is done with all the other paths allowing the other paths to undergo a mutation process where optimal path modes, stored in path element objects, are appended or updated. Mutations could include altering the start time or changing the mode of a path element. For example, a left turn might later become a right turn based on environmental stimulus. Start times for the updated path segments are also updated using the estimated speed of the asset. A fitness score is then computed for each path using various scoring mechanisms that are goal dependent. For example, collection goals are scored using proximity to the target, avoidance goals are scored based on the number of collisions, orbit goals are based on the duration and direction of the rotation, and so forth. This process continues until there is a path produced with a fitness that crosses within some percentage of the theoretical maximum, which is the sum of the weights of the "non-avoidance" goals. Goals that instruct the asset to avoid obstructions, such as the avoid threat, have a negative fitness, thus subtracting from the fitness of a calculated path that passes into the area defined by these goals. Lowering the overall fitness of the path will allow the genetic algorithm to see the path as sub-optimal and will continue the process of evolving the population.

Figure 5B:
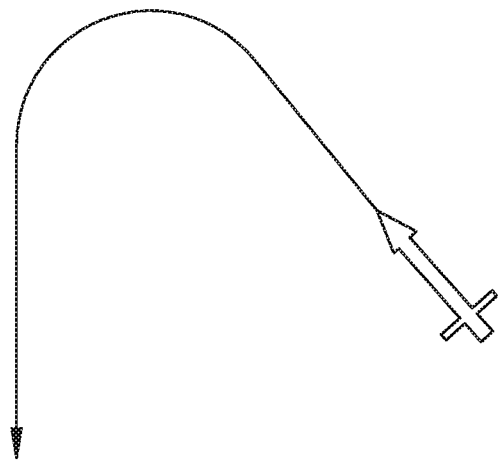
FIGS. 5A and 5B illustrate a problem and solution to excessive orbiting.
Figure 5A:
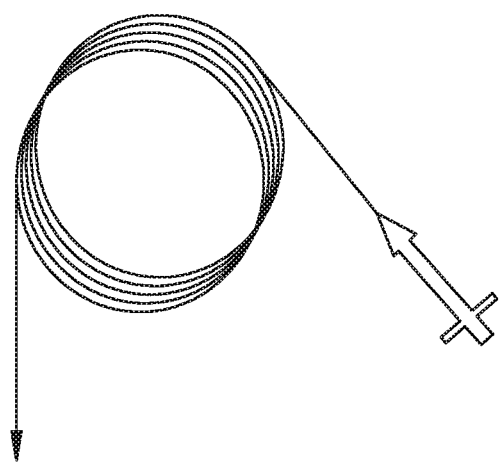

An issue that is addressed by an embodiment is that of the tendency of paths to contain excessive or unnecessary orbits. This problem was caused by the fact that the start times of the path elements were randomly set by the genetic algorithm. The start time dictates the time that the asset should arrive at the beginning of the path segment. If the vehicle is estimated to arrive at the beginning of the path segment early, the algorithm tends to delay the estimated arrival time by adding loops to take up more time. This problem is illustrated in FIG. 5A, which illustrates the excessive orbiting, and in FIG. 5B, which indicates the path after the correction of the excessive orbiting.

To solve this problem, the embodiment starts with the known information—the path mode of the asset, the turn intensity, the direction, and the duration of the path mode. From the given information, the total number of rotations that could be done given the turn rate of the asset is calculated (therefore the total degrees). A modulo operator is used to remove any turns over 360 degrees to figure out the appropriate exit time and to avoid excessive orbiting.

In summary, one or more embodiments includes several features. The embodiments provide asynchronous and computationally driven generation of mission plans, thereby decreasing manual demands of creating paths for assets. The multi-client architecture supports parallel processing of mission plan generation. The embodiments provide a rapid and natural method for commanding sequences of autonomously determined asset modes. The embodiments are naturally validating, such that the generated plan shows the estimated path, not the intended route. The embodiments provide support for multiple goal types with unique and automatic scoring mechanisms that further provide rationale to operators that the generated path will work. The goal-based inputs allow operators to portray needs at a higher level, which simplifies their cognitive workload.

Figure 6C:
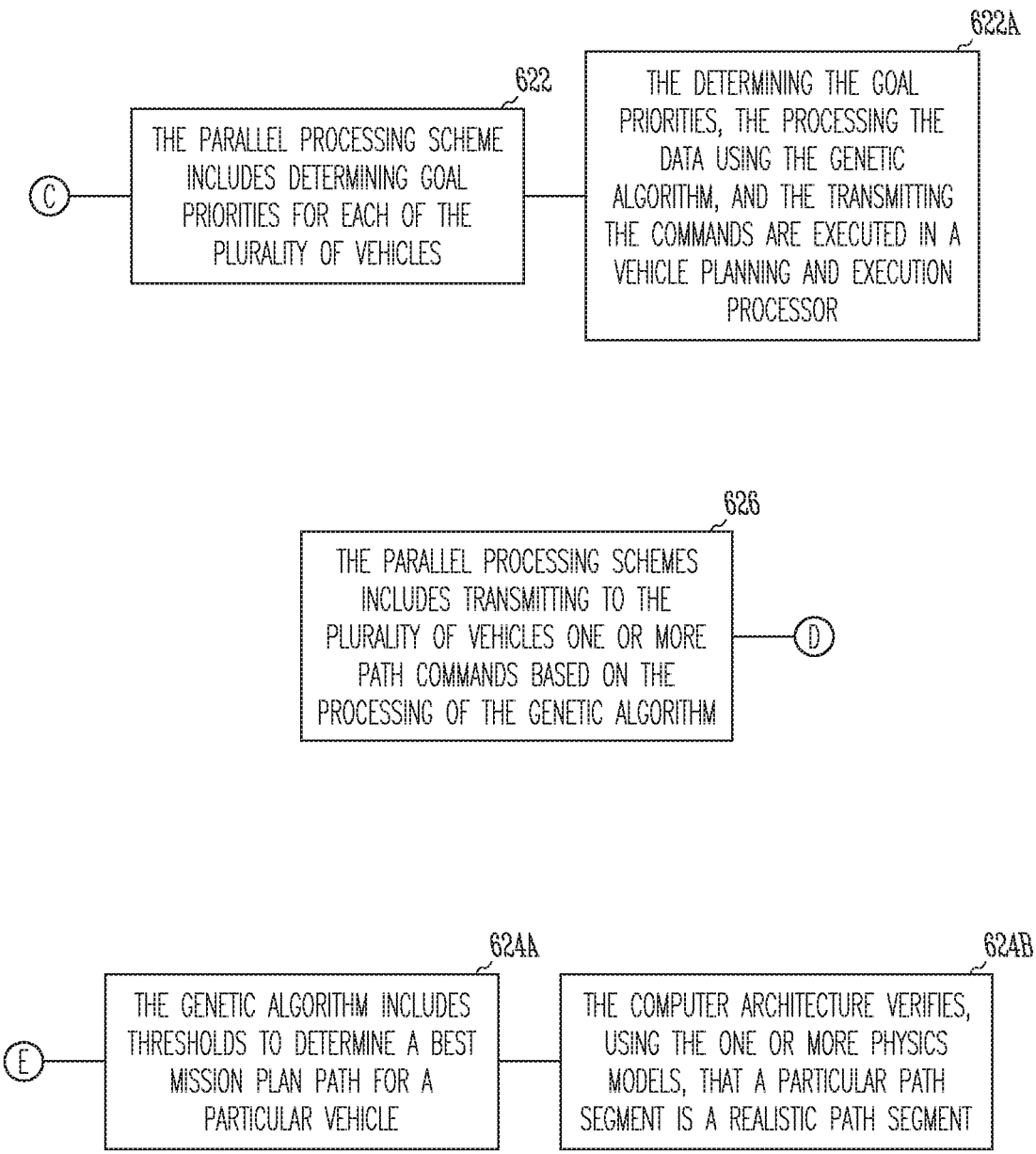

FIGS. 6A, 6B, and 6C are a block diagram illustrating operations and features of an example system and method for creating and scoring mission plan paths for multi-domain assets. FIG. 6 includes a number of process blocks 610-626. Though arranged substantially serially in the example of FIG. 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 6A, 6B, and 6C, at 605, a computer architecture includes a computer processor and an application program interface (API). The application program interface does not include a user interface. The application program interface includes a receiver, which can be referred to as a goal agent manager listener, and the receiver parses the data into vehicle data and goal data (605A). As indicated at 610, the computer architecture is operable to execute a plurality of asynchronous processes for generating mission plan paths. At 615, the computer architecture asynchronously receives, into the application program interface, data relating to a plurality of mission plan domains from a plurality of clients. The data include an identification of a plurality of vehicles, a plurality of goals of the plurality of vehicles, and threats to the plurality of vehicles. The vehicles are unmanned vehicles (615A). The plurality of goals includes a weighting for target-oriented goals and avoidance-oriented goals (615B). The mission plan domains include an air domain, a sea or ocean domain, a space domain, and a land domain (615C). As indicated at 616, in an embodiment, the asynchronously receiving of data relating to the plurality of mission plan domains from the plurality of clients is executed in an application program interface processor. An as further indicated at 617, in an embodiment, the application program interface processor processes the data in a key-value format containing vehicle data and goal attributes. The plurality of goals can include collection goals, orbit goals, threat avoidance goals, weather avoidance goals, and traffic avoidance goals (618).

At 620, the computer architecture uses a parallel processing scheme to process the plurality of mission plan domains from the plurality of clients. This parallel processing scheme includes determining goal priorities for each of the plurality of vehicles (622), processing the data using a genetic algorithm and one or more physics models associated with the plurality of vehicles (624), and transmitting to the plurality of vehicles one or more path commands based on the processing of the genetic algorithm (626). In an embodiment, as indicated at 622A, the determining the goal priorities, the processing the data using the genetic algorithm, and the transmitting the commands are executed in a vehicle planning and execution processor. In another embodiment, as indicated at 624A, the genetic algorithm includes thresholds to determine a best mission plan path for a particular vehicle. At 624B, the computer architecture verifies, using the one or more physics models, that a particular path segment is a realistic path segment. For example, a particular vehicle may not be able to make a sharp turn as required by a particular path segment. In such a case, the path segment would be determined to not be realistic.

Figure 7:
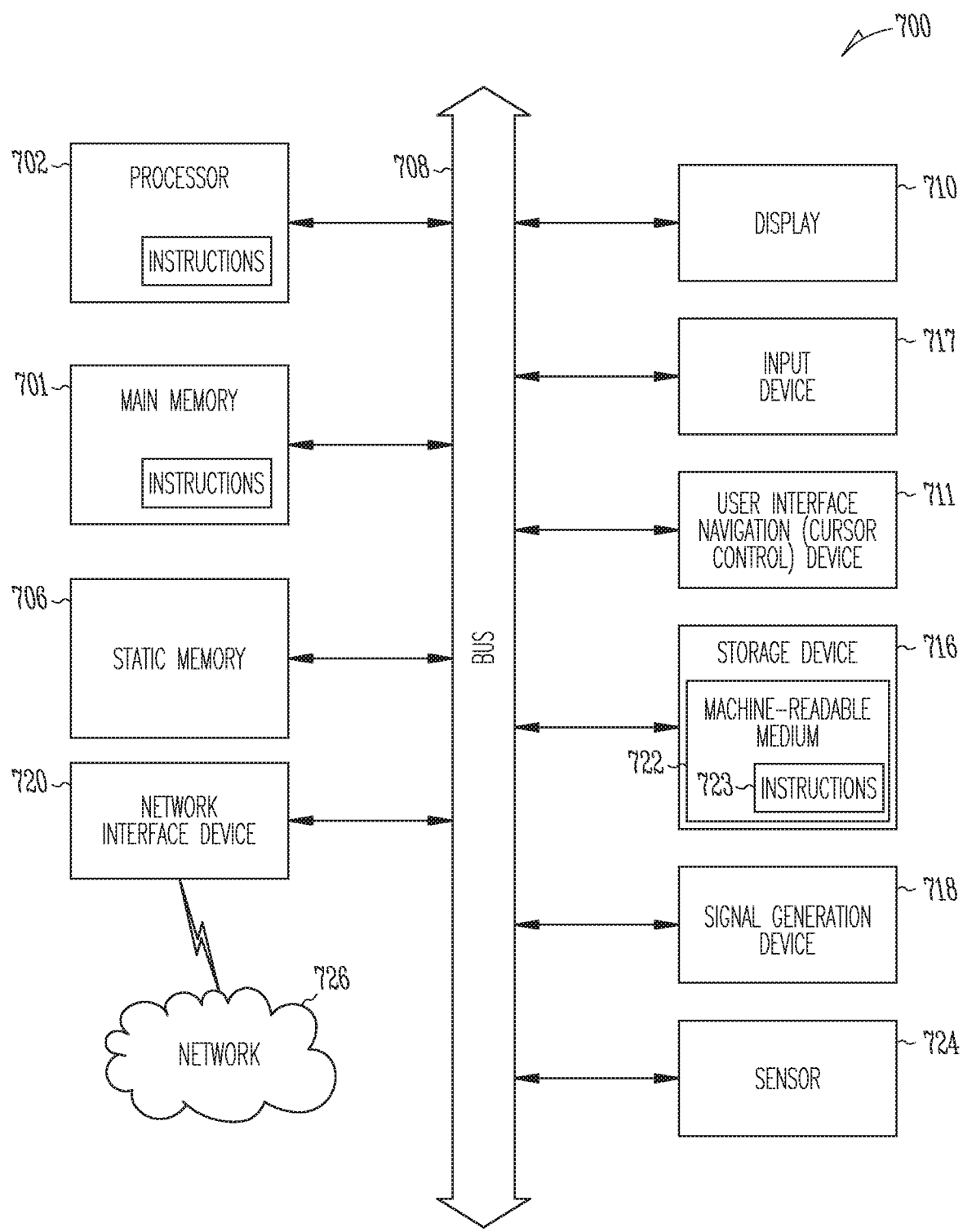
FIG. 7 is a block diagram of a computer system upon which one or more of the disclosed embodiments can execute.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 701 and a static memory 706, which communicate with each other via a bus 708. The computer system 700 may further include a display unit 710, an alphanumeric input device 717 (e.g., a keyboard), and a user interface (UI) navigation device 711 (e.g., a mouse). In one embodiment, the display, input device and cursor control device are a touch screen display. The computer system 700 may additionally include a storage device 716 (e.g., drive unit), a signal generation device 718 (e.g., a speaker), a network interface device 720, and one or more sensors 721, such as a global positioning system sensor, compass, accelerometer, or other sensor.

The drive unit 716 includes a machine-readable medium 722 on which is stored one or more sets of instructions and data structures (e.g., software 723) embodying or utilized by any one or more of the methodologies or functions described herein. The software 723 may also reside, completely or at least partially, within the main memory 701 and/or within the processor 702 during execution thereof by the computer system 700, the main memory 701 and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 723 may further be transmitted or received over a communications network 726 using a transmission medium via the network interface device 720 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A computer architecture comprising:
   a computer processor, the computer processor operable to execute asynchronous processes that generate mission plan paths;
   a computer memory coupled to the computer processor; and
   an application program interface coupled to the computer processor and the computer memory;
   the asynchronous processes for generating mission plan paths comprising:
   asynchronously receiving, by the application program interface, mission plan data relating to mission plan domains, the mission plan data comprises an identification of a vehicle in respective mission plan domains of the mission plan domains, a goal of the vehicle, and threats to the vehicle;
   processing the mission plan data relating to the respective mission plan domains by:
   executing a genetic algorithm constrained by a physics model associated with the vehicle, the genetic algorithm generates potential paths to be travelled by the vehicle in satisfying the goal, the physics model determines the vehicle can physically traverse respective paths of the potential paths and the genetic algorithm evolves the potential paths based on using a potential path of the potential paths with a corresponding score higher than a specified threshold as a seed for a next evolution of potential paths, the physics model accounting for minimum turn radius of the vehicle given the mission plan domain of the mission plan domains of the vehicle and minimum and maximum speed of the vehicle given the mission plan domains of the vehicle, the score determined based on how much of the goal the potential path satisfies, how many of the threats are encountered along the potential path, and how close to a target that is the subject of the goal the potential path traverses;
   transmitting, to the vehicle, one or more path commands for a path of the respective paths that, according to the physics model, the vehicle can traverse.

2. The computer architecture of claim 1, wherein the asynchronously receiving the mission plan data is executed in an application program interface processor, and the executing the genetic algorithm and the transmitting the one or more path commands are executed in a vehicle planning and execution processor.

3. The computer architecture of claim 2, wherein the application program interface processor processes the data in a key-value format containing vehicle data and goal attributes.

4. The computer architecture of claim 1, wherein the goal comprises a collection goal, an orbit goal, a threat avoidance goal, a weather avoidance goal, and a traffic avoidance goal.

5. The computer architecture of claim 1, wherein the genetic algorithm comprises thresholds to determine a best mission plan path for a particular vehicle.

6. The computer architecture of claim 1, wherein the mission plan domains comprise an air domain, a sea or ocean domain, a space domain, and a land domain; and
wherein the vehicle comprises an unmanned vehicle.

7. The computer architecture of claim 1, wherein the application program interface comprises a receiver (goal agent manager listener), wherein the receiver parses the data into vehicle data and goal data.

8. The computer architecture of claim 1, wherein the goal comprises a weighting for a target-oriented goal and an avoidance-oriented goal.

9. A process to execute a plurality of asynchronous processes for generating mission plan paths comprising:
asynchronously receiving, by an application program interface, mission plan data relating to mission plan domains, the mission plan data comprises an identification of a vehicle in respective mission plan domains of the mission plan domains, a goal of the vehicle, and threats to the vehicle;
processing the mission plan data relating to the respective mission plan domains;
executing a genetic algorithm constrained by a physics model associated with the vehicle, the genetic algorithm generates potential paths to be travelled by the vehicle in satisfying the goal, the physics model determines the vehicle can physically traverse respective paths of the potential paths and the genetic algorithm evolves the potential paths based on using a potential path of the potential paths with a corresponding score higher than a specified threshold as a seed for a next evolution of potential paths, the physics model accounting for minimum turn radius of the vehicle given the mission plan domain of the mission plan domains of the vehicle and minimum and maximum speed of the vehicle given the mission plan domains of the vehicle, the score determined based on how much of the goal the potential path satisfies, how many of the threats are encountered along the potential path, and how close to a target that is the subject of the goal the potential path traverses; and
transmitting, to the vehicle, one or more path commands for a path of the respective paths that, according to the physics model, the vehicle can traverse.

10. The process of claim 9, wherein the asynchronously receiving the mission plan data is executed in an application program interface processor, and the executing the genetic algorithm and the transmitting the one or more path commands are executed in a vehicle planning and execution processor.

11. The process of claim 10, wherein the application program interface processor processes the data in a key-value format containing vehicle data and goal attributes.

12. The process of claim 9, wherein the goal comprises a collection goal, an orbit goal, a threat avoidance goal, a weather avoidance goal, and a traffic avoidance goal.

13. The process of claim 9, wherein the genetic algorithm comprises thresholds to determine a best mission plan path for the vehicle.

14. The process of claim 9, and wherein the mission plan domains comprise an air domain, a sea or ocean domain, a space domain, and a land domain; and
wherein the vehicle comprises an unmanned vehicle.

15. The process of claim 9, wherein the application program interface comprises a receiver, wherein the receiver parses the data into vehicle data and goal data.

16. The process of claim 9, wherein the goal comprises a weighting for target-oriented goals and avoidance-oriented goals.

17. A non-transitory computer-readable medium comprising instructions that when executed by a processor execute a process comprising:
asynchronously receiving, by an application program interface, mission plan data relating to mission plan domains, the mission plan data comprises an identification of a vehicle in respective mission plan domains of the mission plan domains, a goal of the vehicle, and threats to the vehicle;
processing the mission plan data relating to the respective mission plan domains;
executing a genetic algorithm constrained by a physics model associated with the vehicle, the genetic algorithm generates potential paths to be travelled by the vehicle in satisfying the goal, the physics model determines the vehicle can physically traverse respective paths of the potential paths and the genetic algorithm evolves the potential paths based on using a potential path of the potential paths with a corresponding score higher than a specified threshold as a seed for a next evolution of potential paths, the physics model accounting for minimum turn radius of the vehicle given the mission plan domain of the mission plan domains of the vehicle and minimum and maximum speed of the vehicle given the mission plan domains of the vehicle, the score determined based on how much of the goal the potential path satisfies, how many of the threats are encountered along the potential path, and how close to a target that is the subject of the goal the potential path traverses; and
transmitting, to the vehicle, one or more path commands for a path of the respective paths that, according to the physics model, the vehicle can traverse.

* * * * *